(12) United States Patent
Paskoff et al.

(10) Patent No.: US 7,819,031 B2
(45) Date of Patent: Oct. 26, 2010

(54) PARACHUTE OPENING AND SHOCK EMULATOR

(75) Inventors: Glenn Paskoff, Lusby, MD (US); Edwin Sieveka, Valley Lee, MD (US); Curt Foianini, California, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 394 days.

(21) Appl. No.: 12/056,707

(22) Filed: Mar. 27, 2008

(65) Prior Publication Data

US 2009/0241635 A1 Oct. 1, 2009

(51) Int. Cl.
*G01M 7/00* (2006.01)
*G01M 19/00* (2006.01)

(52) U.S. Cl. .................................. 73/865.3; 73/12.04

(58) Field of Classification Search ............... 73/12.04, 73/12.09, 865.3, 865.6; 434/30, 55
See application file for complete search history.

(56) References Cited

U.S. PATENT DOCUMENTS 4,580,982 A * 4/1986 Ruppert ....................... 434/30

OTHER PUBLICATIONS

Barry S shender and Glenn Paskoff,Overview of the NAVAIR Spinal Injury Mitigation Program, Oct. 24-25, 2005, pp. 189-190.*

* cited by examiner

*Primary Examiner*—Hezron Williams
*Assistant Examiner*—Tamiko D Bellamy
(74) *Attorney, Agent, or Firm*—Mark O. Glut

(57) ABSTRACT

A parachute opening shock emulator including a seat structure and a catching mechanism. The seat structure includes a seat for holding a manikin, the seat is movable such that the manikin can be pulled from the seat simulating the parachute opening shock phase of an ejection. The catching mechanism is for catching the manikin after it is pulled from the seat.

8 Claims, 4 Drawing Sheets

PARACHUTE OPENING AND SHOCK EMULATOR

STATEMENT OF GOVERNMENT INTEREST

The invention described herein may be manufactured and used by or for the Government of the United States of America for governmental purposes without payment of any royalties thereon or therefor.

BACKGROUND

The present invention relates to a parachute opening shock emulator. More specifically, but without limitation, the present invention is an ejection seat simulator that simulates the parachute opening shock phase of an ejection.

Aviators and/or aircrew may have to eject from an aircraft, especially in combat situations, at high-speed and/or in adverse conditions. High speed ejection can be characterized by several phases. High-speed ejection phases include: initiation/catapult; under-seat rocket motor; drogue stabilization; parachute opening; and parachute landing. Each of these phases has inherent dangers and is capable of resulting in injury to the aircrew member. Typically, expensive component and system level testing is conducted on escape and man-mounted equipment systems to try to improve performance and to identify and mitigate safety risks to the aircrew member during high speed ejection. Under many ejection conditions, the most hazardous phase to the aircrew member is parachute opening shock. It is during this time that the aircrew member is rapidly separated from the relative protection of the aircraft and the aircraft seat. Currently, this event may only be examined during system level testing that is highly chaotic, difficult to obtain adequate data and video, and very costly. Due to the unpredictable nature of such testing, manikins have recorded large variations in measured accelerations and neck and head loads, even when attempting to regulate such variables. Currently, there is no system capable of reproducing the parachute opening shock phase repeatably in a controlled and cost effective manner.

With the expansion of the military aviator and aircrew population to include smaller males and females, an unknown level of risk has been introduced into high speed ejections. Additionally, helmets have changed to include night vision capabilities, head-up displays, and target acquisition devices. The effect of these systems increases head supported weight and shifts the center of gravity of the head region forward, a weaker condition for the neck physiologically. In order to quantitatively determine the overall effects on system performance and occupant safety, extensive system level testing is required.

During ejection, there is an abrupt deceleration of the body during line stretch and inflation of the aircrew's personal parachute. Peak acceleration during this phase is a function of aircrew mass properties, barometric and dynamic pressures, recovery parachute type, drag area and opening aids. Examples of opening aids include spreader guns and pull down vent lines, which decrease the time it takes to open a parachute and thus increase the resultant acceleration on the aircrew member. Lighter aircrew typically experience higher snatch forces and opening shocks due to their lesser mass. Depending on their initial position of the body, the linear and angular deceleration may be aggravated as the body is twisted and pulled into alignment with the parachute's opening vector. Additionally, currently used human tolerance limits for torso accelerations were derived specifically for the automotive industry. These tests were performed with subjects (such as humans and primates) in rigid seats with rigid head rests and specific restraint systems. This data has limited application to parachute opening shock in which the body is completely unrestrained and loading may be applied in any direction.

For the foregoing reasons, there is a need for a system capable of reproducing the parachute opening shock phase repeatedly, regardless of other conditions.

SUMMARY

The present invention is directed to a parachute opening shock emulator that meets the needs enumerated above and below.

The present invention is directed to a parachute opening shock emulator, which includes a seat structure and a catching mechanism. The seat structure includes a seat for holding a manikin, and the seat is movable such that the manikin can be pulled from the seat simulating the parachute opening shock phase of an ejection. After being pulled, the manikin is caught by the catching mechanism.

It is a feature of the present invention to provide a parachute opening shock emulator that provides a highly repeatable method of replicating parachute opening shock.

It is a feature of the present invention to provide a parachute opening shock emulator that enables comprehensive analysis spanning the entire ejection airspeed envelope at a much lower cost and in a more controlled environment.

DRAWINGS

These and other features, aspects and advantages of the present invention will become better understood with reference to the following description and appended claims, and accompanying drawings wherein:

DESCRIPTION

Figure 1:
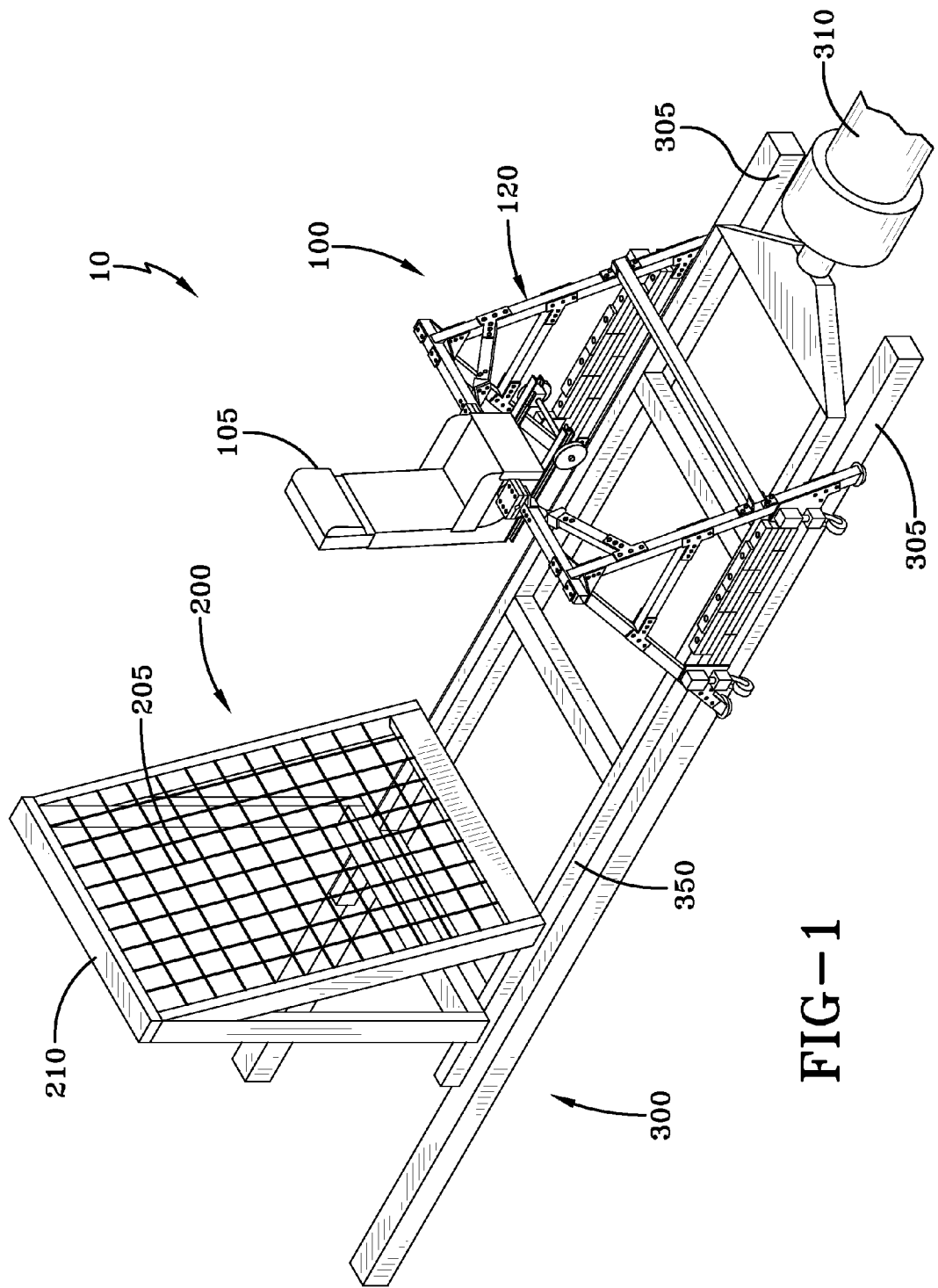
FIG. 1 is a perspective view of an embodiment of the parachute opening shock emulator.

The preferred embodiments of the present invention are illustrated by way of example below and in FIGS. 1-4. The parachute opening shock emulator 10 includes a seat structure 100 and a catching mechanism 200. The seat structure 100 includes a seat 105 for holding a manikin 50, and the seat 105 is movable such that the manikin 50 can be pulled from the seat such that the seat/manikin separation simulates the parachute opening shock phase of an ejection and the manikin 50 is caught by the catching mechanism 200.

In the description of the present invention, the invention will be discussed in a military aircraft environment; however, this invention can be utilized for any type of application that requires use of a large mass being rapidly accelerated from a stationary position.

The seat structure 100 may include a seat 105 and a frame 120. The seat 105 is rotatably attached to the frame 120 such that the seat 105 may pivot and/or rotate and be pinned to a desired pitch orientation in relation to the frame 120.

Figure 2:
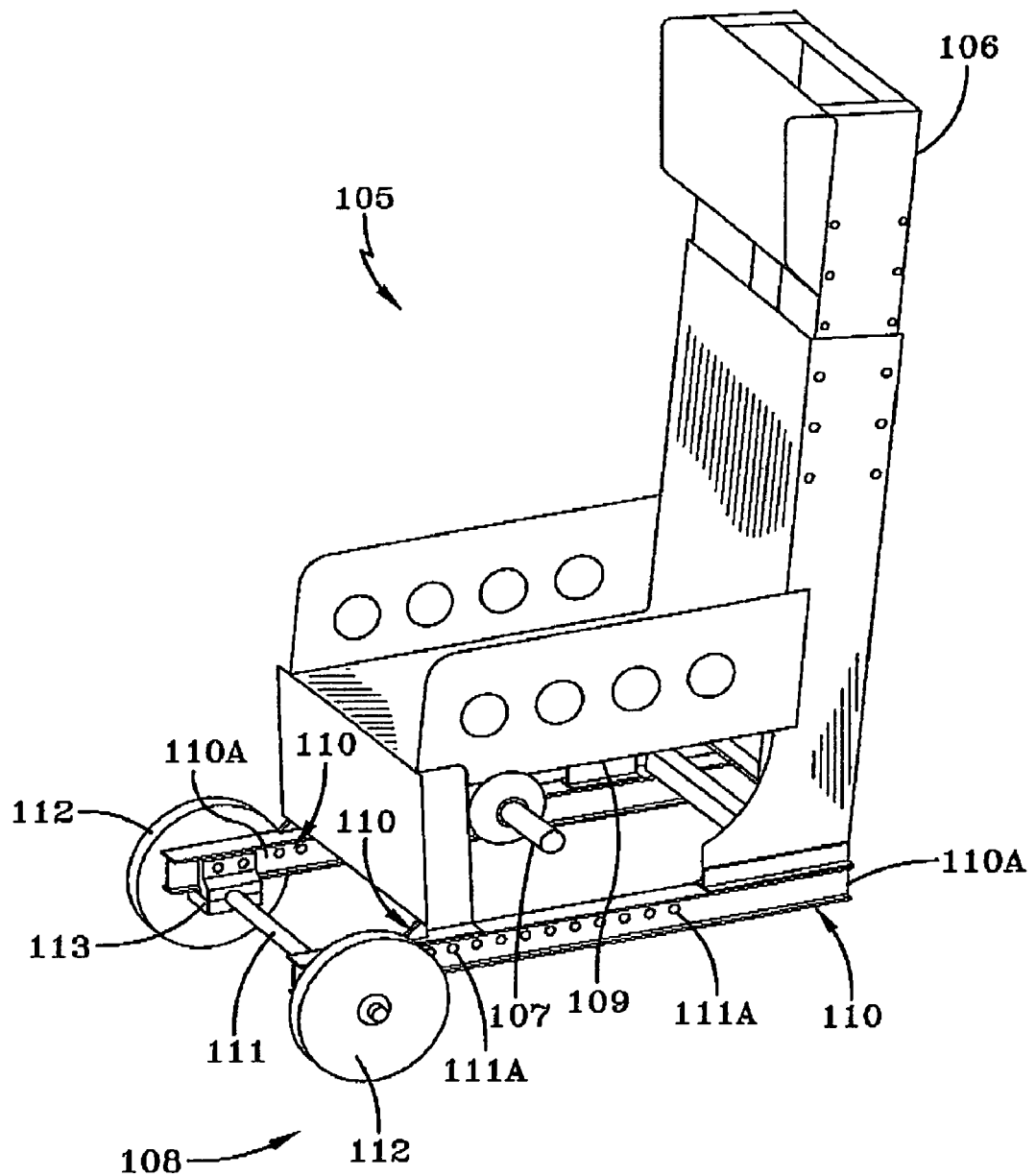
FIG. 2 is a perspective view of an embodiment of the seat of the seat structure.

As shown in FIG. 2, in one of the embodiments of the seat 105, the seat 105 is shaped like a standard type aircraft seat, specifically a military pilot aircraft seat. The seat 105 includes an adjustable head box 106, a pivot bar 107 and a counter balance undercarriage 110 with counter balance weights 108. The pivot bar 107 is movable and may be bolted in various locations along the bottom of the seat or seat pan 109 (area where aircrew member sits). The pivot bar 107 is used to replicate the kinematics of the force/reaction mass during decoupling of the manikin 50 and the seat 105. The counter balance weights 108 are used to shift the center of gravity of the seat 105 to the center of the pivot bar 107. The counter balance weights 108 may be disposed on the bottom of the seat 105. The counter balance weights 108 can be moved to different locations along the counter balance undercarriage 110. The counter balance undercarriage 110 may be disposed under the seat 105 and may include one or more undercarriage bars 110A as shown in FIG. 2, and the counter balance weights 108 may be moved along locations of the undercarriage bars 110A. The counter balance weights 108 may be a combination of weights or as shown in FIG. 2, a weight bar 111 with two weights 112 disposed on opposite ends of the weight bar 111. The counter balance weights 108 may also include a pin attachment apparatus 113 and the counter weight undercarriage 110, particularly each undercarriage bar 110A, may include counter weight bar holes 111A. The pin attachment apparatus 113 may communicate with the counter weight bar holes 111A such that the counter weights 108 may be moved along the counter balance undercarriage 110 or undercarriage bar 110A, and then attached via the counter weight bar holes 111A and pin attachment apparatus 113. If there are multiple undercarriage bars 110A, there may be multiple pin attachment apparatuses 113 that correspond to each undercarriage bar 110A. In the preferred embodiment, the undercarriage bars 110A are substantially parallel to each other. The seat 105 is pinned to the desired pitch orientation and the pivot bar location and the counter balance weights 108 are adjusted according to pre-calculated measurements.

Figure 3:
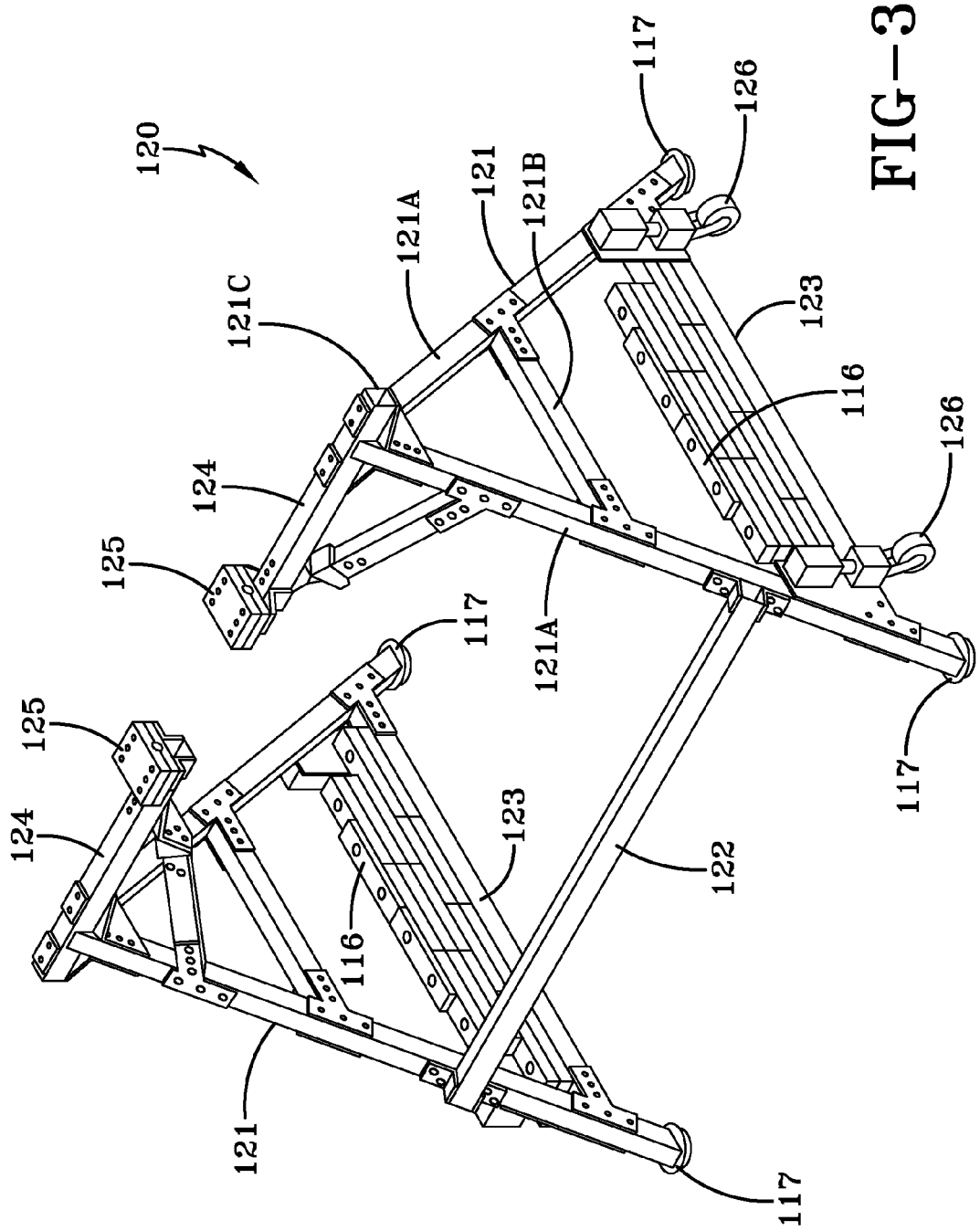
FIG. 3 is a perspective view of an embodiment of the frame of the seat structure; and, FIG. 4 is a side view of a portion of an embodiment of the parachute opening shock emulator.

As shown in FIG. 3, the frame 120 may be an A-frame type structure. The frame 120 may include two substantially parallel A-sections 121 and a cross bar 122. The A-sections 121 may each include two side bars 121A connected at each others' ends at an oblique angle (creating an A-section apex 121C) and an A-section cross bar 121B. The A-section cross bar 121B is disposed below the A-section apex 121C and is connected to both side bars 121A. In the preferred embodiment, the cross bar 121B is substantially parallel with the ground. The A-sections 121 may be disposed and attached at the opposite ends of the cross bar 122. As shown in FIG. 3, each end of the cross bar 122 may be attached to a corresponding side bar 121A of each of the A-sections 121. The A-sections 121 may also include several supporting sections or supporting beams 123 or bars in addition to the A-section cross bar 121B. On top of the supporting beam(s) 123, ballast weights 116 may be placed. At the end of each A-section side bar 121A opposite from the A-section apex 121C there are feet 117. The ballast weights 116 on each side of the frame 120 and the feet 117 keep the frame 120 securely placed during testing. The feet 117 also aid in absorbing the energy transmitted by the frame 120 during testing. In the preferred embodiment of the invention, the feet 117 are manufactured from sorbothane; however, any type of material deemed practicable may be utilized. Each A-section 121 may include a seat bar 124, which is disposed at the A-section apex 121C of the A-section 121. At one end of the seat bar 124, the seat bar communicates with the apex of the A-section 121, while at the other end a platform 125 is disposed. Each seat bar 124 is disposed such that both seat bars are substantially axially aligned. The seat 105 may be in communication with each of the platforms 125, particularly the pivot bar 107 may be rotatably communicating with each platform 125. The frame 120 is designed to be stationary; however, the frame 120 may also include pneumatically-driven casters 126 that can be lowered such that the frame 120 can be easily moved (the casters 126 communicating with the floor) or lifted such the casters 126 are not touching the floor and cannot easily be moved along the floor, especially during testing.

The frame 120 may be manufactured from an aluminum alloy. The preferred material is 6061T6 aluminum; however, any material deemed practicable may be utilized.

The catching mechanism 200 may be a net 205. As shown in FIG. 1, the catching mechanism 200 may include a net 205 and a net frame 210. The net 205 may be mounted on the net frame 210 and disposed at an appropriate position to catch the manikin 50 as it is being pulled from the seat 105. The net 205 may be nylon webbing used in conjunction with seat belt adjusters. The net frame 205 may be manufactured from an aluminum alloy or any other material practicable.

Figure 4:
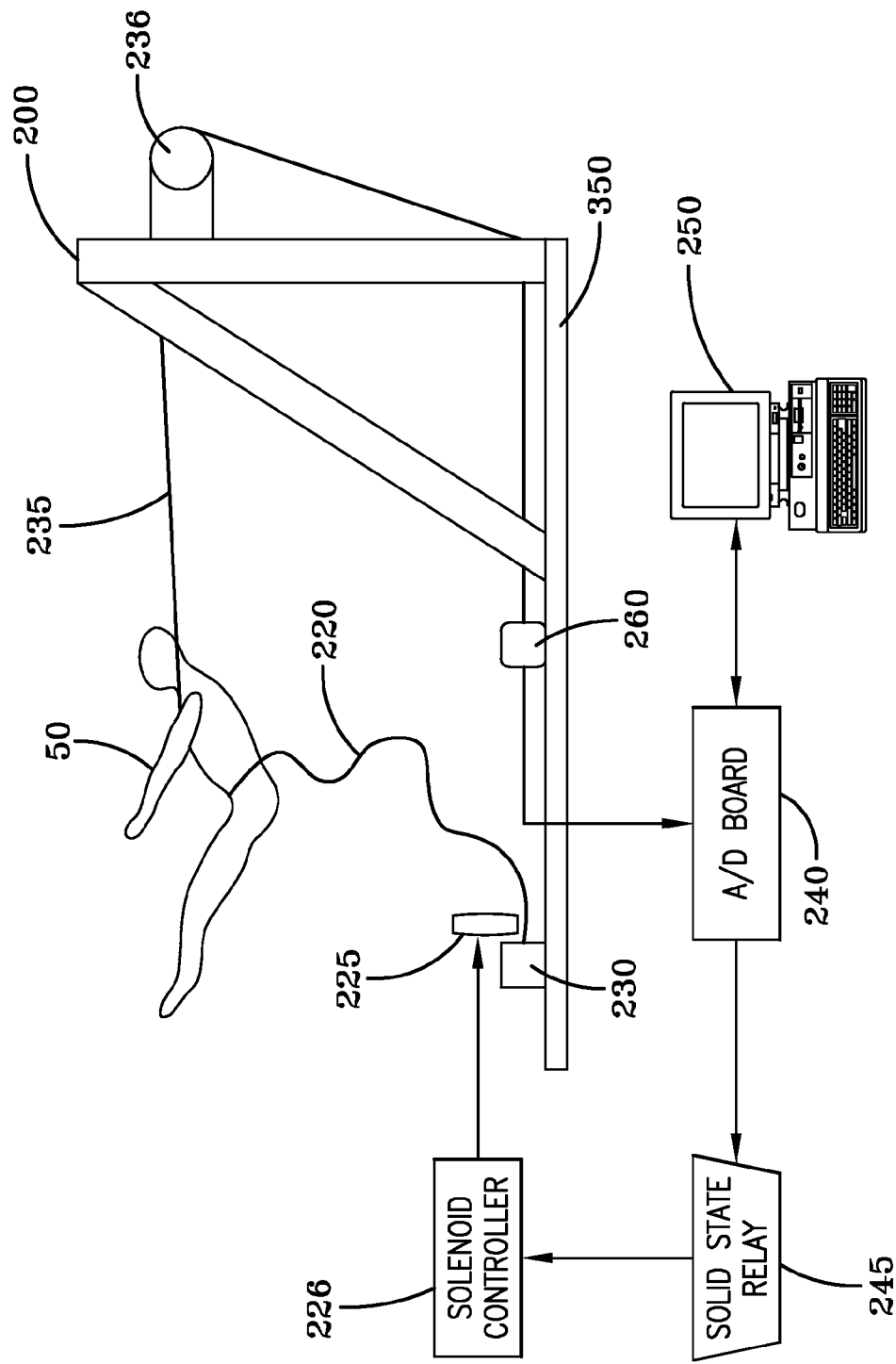

As shown in FIG. 4, the manikin 50 may also be attached to back-up webbing 220, which is attached to a solenoid 225 and a Mobile Aircrew Restraint System (MARS) 230. The solenoid 225 can retract the slack to the back up webbing 220 such that the manikin 50 does not exceed the vertical height of the catching mechanism 200 (particularly the net 205). A Mobile Aircrew Restraint System 230 is typically defined, but without limitation, as a restraint system that is characteristically used to prevent a gunner or a crew member from falling out of an aircraft but still allow the crew member to move around the inside of the aircraft. The solenoid 225, in conjunction with the Mobile Aircrew Restraint System 230 via a solenoid controller 226 and a computer configuration, controls the timed retraction of the back up webbing 220. The manikin 50 may also be attached to a parachute riser rope 235 to ensure the manikin 50 is pulled toward the net 205, as well as caught by the net 205.

In the preferred embodiment, as shown in FIG. 4, the parachute riser 235 may be communicating with a load cell 260, which is communicating with an A/D board 240 and a computer 250 that analyzes the load via the load cell 260 in real time and sends a signal to the A/D board 240 and a relay switch 245 which communicates with the solenoid controller 226 which activates the solenoid 225.

The parachute opening shock emulator 10 may also include a horizontal accelerator 300. A horizontal accelerator 300 may be defined, but without limitation, as an apparatus that can make an object move along a track at various speeds and can be used to create acceleration forces and pulse shapes typically seen in crashes and other types of accelerated environments. The horizontal accelerator 300 may include a sled track 305 (which includes two substantially parallel rails) and a hydraulically controlled linear actuator 310 to move and/or accelerate the objects along the track. The preferred horizontal accelerator 300 operates at a 50 G maximum acceleration, with a 5,000 pound maximum payload at 20 G's. The catching mechanism 200 may rest on or be attached to a sled 350 that moves along the tracks 305. In the preferred embodiment, the controlled linear actuator 310 couples to the front of the sled 350 and pushes the sled 350, along with the catching mechanism 200, away from the seat structure 100. The A-sections 121 of the frame 120 may straddle the rails of the sled track 305. In the preferred embodiment, the distance between the A-sections 121 is greater than the width of the catching structure 200 as well the distance between the rails of the sled track 305.

In operation of one of the embodiments, the manikin 50 is lowered into the seat 105, typically through use of an over-head crane. The location of the frame 120 relative to the catching mechanism 200 is dependent upon the position of the seat 105. The casters 126 of the frame 120 are lowered (can be done by shop air) to position the frame 120. Once the frame 120 is properly positioned, the casters 126 are raised and the frame 120 is now stationary on the ground. Parachute rise ropes 235, particularly dynamic climbing ropes, are connected to a torso harness on the manikin 50. The parachute riser ropes 235 are routed over the A-frame 120 where they are tied to the floor of the sled 350 and communicating with the load cell 240. As shown in FIG. 4, the parachute riser ropes 235 may be directed toward the floor by a low friction cylinder 236 or pulley type system. The catching mechanism 200 is communicating with the horizontal accelerator 300 such that the catching mechanism 200 can be moved along the rails of the horizontal accelerator 300 at various speeds. The horizontal accelerator 300 is engaged and pushes the sled 350. The sled 350 along with the catching mechanism 200 moves away from the seat structure 100, pulling the manikin 50 toward and to the net 205. During this time-frame, loads, accelerations and high speed video are taken to be analyzed in order to study parachute opening shock.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A parachute opening shock emulator, comprising:
  a seat structure comprising a frame and a seat for holding a manikin, wherein the frame comprises two substantially parallel A-sections, two seat bars, two seat platforms and a cross bar, the A-sections each disposed on opposite ends of the cross bar, the A-sections having an apex wherein the seat bars are disposed, each seat platform attached to a corresponding seat bar, the seat rotatably attached to the each seat platform, the seat movable such that the manikin cap be pulled from the seat simulating the parachute opening shock phase of an ejection;
  a catching mechanism for catching the manikin after it is pulled from the seat, the catching mechanism includes a net and a rope for pulling the manikin toward the net; and,
  a horizontal accelerator, the horizontal accelerator for moving the catching mechanism such that a wide variety of opening parachute shock loads can be placed on the manikin.

2. The parachute opening shock emulator of claim 1, wherein the frame further includes casters that can be lowered to move the frame along a floor and raised to prevent contact with the floor.

3. The parachute opening shock emulator of claim 2, wherein the horizontal accelerator further includes a sled for holding and accelerating the catching mechanism.

4. The parachute opening shock emulator of claim 3, wherein the horizontal accelerator further includes a sled track for guiding the sled and a hydraulically controlled linear actuator for moving and accelerating the sled along the sled track.

5. A parachute opening shock emulator, comprising:
  a seat structure comprising a frame and a seat for holding a manikin, the seat movable such that the manikin can be pulled from the seat simulating the parachute opening shock phase of an ejection, the seat having a pivot bar, the frame comprises two A-sections, two seat bars, two seat platforms and a cross bar, the A-sections each disposed on opposite ends of the cross bar, the A-sections having an apex wherein the seat bars are disposed, each seat platform attached to a corresponding seat bar, the pivot bar rotatably attached to each seat platform;
  a catching mechanism for catching the manikin after it is pulled from the seat, the catching mechanism includes a net and a rope for pulling the manikin toward the net;
  a horizontal accelerator, the horizontal accelerator for moving the catching mechanism such that a wide variety of opening parachute shock loads can be placed on the manikin, the horizontal accelerator comprising a track and a hydraulically controlled linear actuator, the hydraulically controlled linear actuator for moving and accelerating the catching mechanism along the track;
  a backup webbing attached to the manikin such that the manikin does not exceed the vertical height of the catching mechanism when the manikin is pulled from the seat; and,
  a solenoid and a Mobile Aircrew Restraint System whereby the solenoid and the Mobile Aircrew Restrain System act in conjunction to control the timed retraction of the back up webbing.

6. The parachute opening shock emulator of claim 5, wherein the seat includes an adjustable head box and counter balance weights for shifting the center of gravity of the seat to the center of the pivot bar, and the pivot bar being able to replicate the kinematics of the force/reaction mass during decoupling of the manikin and the seat.

7. The parachute opening shock emulator of claim 6, wherein the frame further includes casters that can be lowered to move the frame along a floor and raised to prevent contact with the floor.

8. The parachute opening shock emulator of claim 7, wherein the horizontal accelerator further includes a sled for holding and accelerating the catching mechanism, and the sled corresponding to the track.

* * * * *